F. C. PERKINS.
VULCANIZER.
APPLICATION FILED OCT. 9, 1907.
906,556.
Patented Dec. 15, 1908.
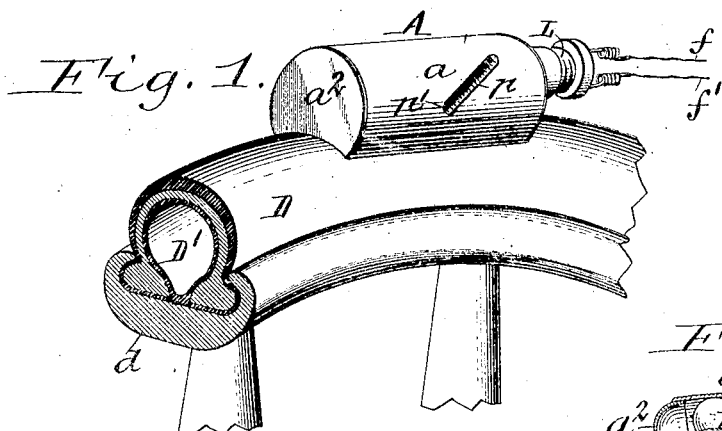
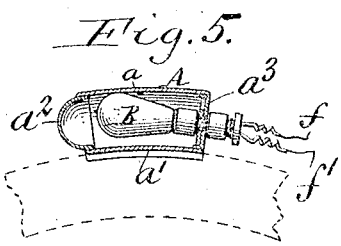
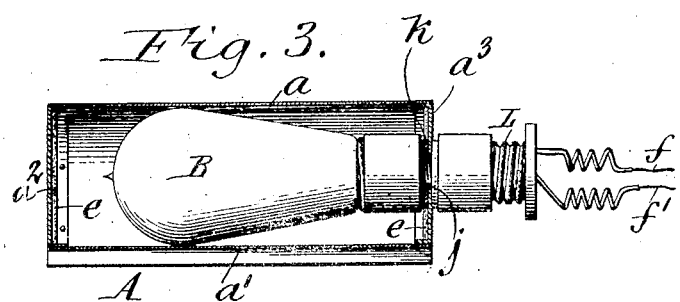
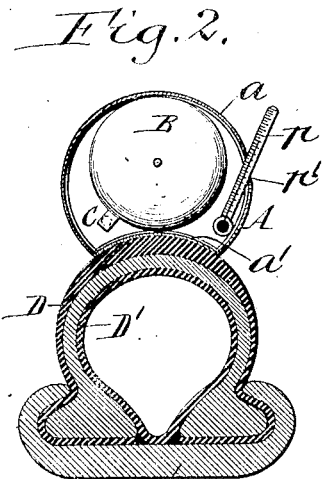
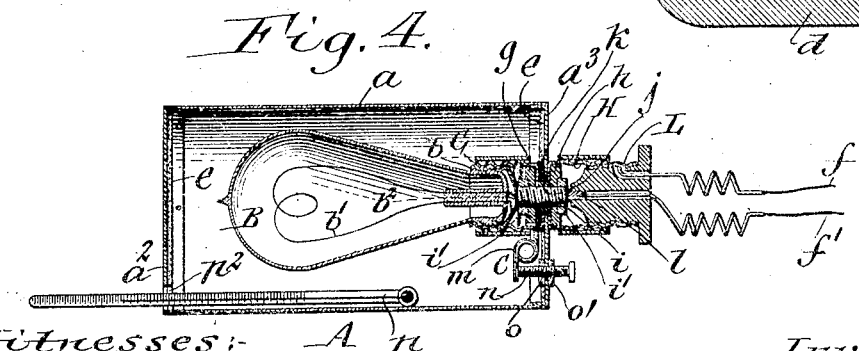

UNITED STATES PATENT OFFICE.

FRANK C. PERKINS, OF BUFFALO, NEW YORK, ASSIGNOR OF ONE-HALF TO FERDINAND E. FINSTERBACH, OF BUFFALO, NEW YORK.

VULCANIZER.

No. 906,556.  Specification of Letters Patent.  Patented Dec. 15, 1908.

Application filed October 9, 1907. Serial No. 336,542.

*To all whom it may concern:*

Be it known that I, FRANK C. PERKINS, a citizen of the United States, residing at Buffalo, in the county of Erie and State of New York, have invented a new and useful Improvement in Vulcanizers, of which the following is a specification.

This invention has for its object the production of a simple, cheap and efficient vulcanizer whereby the outer and inner tubes of tires and other rubber articles may be readily and conveniently repaired.

In the accompanying drawings: Figure 1 is a sectional perspective view showing one form of my improved vulcanizer applied to the outer side of the outer tube of a pneumatic tire. Fig. 2 is a cross section of the same, on an enlarged scale. Fig. 3 is a vertical longitudinal section of the vulcanizer taken on one side of the center. Fig. 4 is a horizontal longitudinal section of the same taken through the center thereof. Fig. 5 is a longitudinal section, on a reduced scale, showing a modified construction of my improved vulcanizer.

Similar letters of reference indicate corresponding parts throughout the several views.

In its general organization this vulcanizer comprises a heating chamber A, an incandescent electric lamp or other electric heater B arranged within the chamber, and a thermostat C for automatically regulating the heat in the chamber.

The heating chamber is constructed of metal and may be of various forms but preferably comprises an outer longitudinal convex wall $a$, an inner longitudinal concave wall $a^1$ and transverse front and rear end walls $a^2$, $a^3$, thereby producing a chamber which is crescent-shaped in cross section. The side walls of the chamber may be straight lengthwise, as shown in Figs. 1, 3 and 4 or the same may be curved lengthwise, as shown in Fig. 5. The transverse end walls may be flat as shown at both ends of the chamber in Figs. 1, 3 and 4, or convex as shown at the front end of Fig. 5. This form of heating chamber enables the same to be engaged fully with a comparatively large area of the outer tube D of the tire by fitting the concave inner wall of the chamber against this side of said tube, as shown in Figs. 1 and 2, whereby the maximum effect of the heat in the chamber is obtained and a large repair patch may be vulcanized on the outer tube in a comparatively short time. A patch can thus be vulcanized on any part of the outer tube of the tire not covered by the wheel rim $d$ by means of my improved vulcanizer without taking the tire from the wheel rim and such parts of the outer tube of the tire which are covered by the rim when the parts are assembled can also be repaired by my improved vulcanizer after removing the tire from the rim. If the inner tube $D^1$ of the tire requires repairing this can be done by placing this tube on or wrapping or strapping the same around the heating chamber with the part bearing the patch preferably engaging the convex side of the chamber. Other articles of rubber may be repaired with equal facility by either placing the heating chamber on the patch and article or by placing the latter on the heating chamber.

In order to confine the heat of the electric heater or lamp and cause the same to radiate only at its sides the end walls thereof may be provided with a lining $e$, $e$ of heat insulating material consisting preferably of sheets of asbestos or fiber secured to the inner sides of the end walls, as shown in Figs. 3 and 4.

The heater preferably consists of an incandescent lamp of usual and well known construction provided with a metal screw plug $b$ to which one end of the filament $b^1$ is connected and a central contact $b^2$ to which the other end of the filament is connected. The head at either one end or the other of the chamber may be made removable to permit of inserting the heater or lamp into the chamber and removing the same therefrom but in the drawings the front head is fixed on the chamber while the rear head is removably fitted in the rear end of the chamber. The rear head is held in place by friction when the vulcanizer is in use although additional securing means may be provided for this purpose if desired.

The lamp may be supported in the heating chamber and coupled with the feed wires $f$, $f^1$ and thermostat C in various ways. It is preferable however to support the lamp, electrical coupling and thermostat on the removable head of the heating chamber so that when the head is removed said parts are also removed and can be readily inspected, repaired or adjusted. The means for thus supporting the lamp, coupling and thermostat shown in the drawings, as an example, are preferred and are constructed as follows:—

On opposite sides of the rear end wall of the chamber are arranged two sockets which have metal screw sleeves G, H and heads or disks $g$, $h$ of insulating material, respectively. The disks are connected by a tie bolt $i$ passing centrally through the same and the rear wall, and inner and outer screw nuts $i^1$ arranged on the tie bolt and bearing against the disks $g$, $h$. The tie bolt is insulated from the rear wall by an insulating sleeve $j$ surrounding the central part of the same. The screw sleeve H of the outer socket bears against the rear metal wall $a^3$ of the chamber but the inner socket is insulated therefrom by an insulating washer $k$ interposed between the same when a thermostat is used. When the vulcanizer is operated without a thermostat both inner and outer socket sleeves bear against the rear wall. Upon screwing the lamp into the inner socket its terminals engage with the same and the tie bolt, respectively.

L represents the metal screw sleeve of a feed plug which connects with one of the feed wires and $l$ the central contact of the feed plug which connects with the other feed wire. Upon screwing this feed plug into the screw sleeve H of the outer socket of the rear wall the screw sleeve L thereof engages the metal thread of the outer socket and its central contact engages with the tie bolt, as shown in Fig. 4.

$m$ represents the expansible and contractible coil or spring of the thermostat which is arranged within the chamber adjacent to the rear wall thereof and which is connected with its fixed end to the metal screw sleeve of the inner or lamp socket while its free end is adapted to move toward and from an adjustable contact screw $n$ arranged in the metal rear wall of the chamber.

When the temperature in the heating chamber is at or below normal the thermostatic coil is contracted and bears with its free end against the contact $n$, thereby closing the electric circuit through the lamp and causing the latter to develop heat but when the temperature of the heat in the chamber rises above normal the thermostatic coil expands and moves with its free end out of contact from the screw $n$, thereby breaking the electric circuit and extinguishing the lamp. When the heating chamber has cooled sufficiently so that its normal temperature has been restored the electric circuit is reëstablished by the thermostat and heating of the chamber by the lamp is resumed. By turning the screw $n$ forward or backward the degree of temperature which it is desired to maintain in the heating chamber can be determined. After adjustment the screw $n$ is held in place by jam nuts $o$, $o^1$ arranged on said screw and bearing against opposite sides of the rear wall of the chamber.

In order to enable the temperature of the heat within the chamber to be known a thermometer $p$ is provided. This thermometer may be passed through an opening formed in the chamber and engaged with its bulb against the inner side of the chamber while its opposite graduated end projects outside of the chamber to permit of reading the same. In Figs. 1 and 2 the heating chamber is provided with a thermometer opening $p^1$ in its side wall and in Fig. 4 the chamber is provided with a thermometer opening $p^2$ in its front end wall.

I claim as my invention:

A vulcanizer comprising a heating chamber having a removable wall or section, an incandescent electric lamp arranged in the chamber, inner and outer sockets secured to opposite sides of said movable wall, the inner socket receiving said lamp and the outer socket adapted to receive the plug of feed wires, and a thermostatic switch for regulating the flow of electricity through the lamp and comprising a thermostatic coil connected at one end with the lamp socket, and a screw mounted on the removable head and adapted to be engaged by the other end of said coil, substantially as set forth.

Witness my hand this 5th day of October, 1907.

FRANK C. PERKINS.

Witnesses:
  L. . Boies,
  Gustav W. Hora.